United States Patent

[11] 3,582,001

| [72] | Inventor | Irving B. Rose |
| | | 4135 Mischire St., Houston, Tex. 77025 |
| [21] | Appl. No. | 752,374 |
| [22] | Filed | Aug. 13, 1968 |
| [45] | Patented | June 1, 1971 |

[54] SYSTEM AND METHOD FOR REFINING FERROUS-BEARING SCRAP MATERIAL
7 Claims, 6 Drawing Figs.

[52] U.S. Cl............................................ 241/3,
29/403, 100/39, 100/95, 241/29
[51] Int. Cl........................................... B02c 19/12
[50] Field of Search............................ 29/403;
100/94, 95, 39, 102; 241/3, 154, 29, 101

[56] References Cited
UNITED STATES PATENTS

| 2,059,229 | 11/1936 | Gregg............................ | 241/27X |
| 2,150,984 | 3/1939 | Near et al..................... | 100/95X |
| 3,038,672 | 6/1962 | Langsetmo et al............ | 241/154X |
| 3,180,249 | 4/1965 | Patros.......................... | 100/95X |
| 3,283,698 | 11/1966 | Williams....................... | 100/95 |
| 3,320,051 | 5/1967 | Lieberman.................... | 29/403UX |
| 3,356,016 | 12/1967 | Eidal............................. | 100/95X |
| 3,426,674 | 2/1969 | Testolir........................ | 100/95 |
| 3,489,078 | 1/1970 | Oberhellmann............... | 100/95 |

Primary Examiner—John F. Campbell
Assistant Examiner—D. C. Reiley
Attorney—R. Werlin

ABSTRACT: A mechanized system and processing method for refining gross raw scrap material, such as automobile bodies and frames, other larger objects such as refrigerators, and smaller pieces of scrap material of various shapes and sizes, to produce therefrom a fluent mass of particulate metal relatively free of nonmetallic refuse, and separated into ferrous and nonferrous portions, the ferrous portion so formed being in condition for direct use as raw material for steel-making operations.

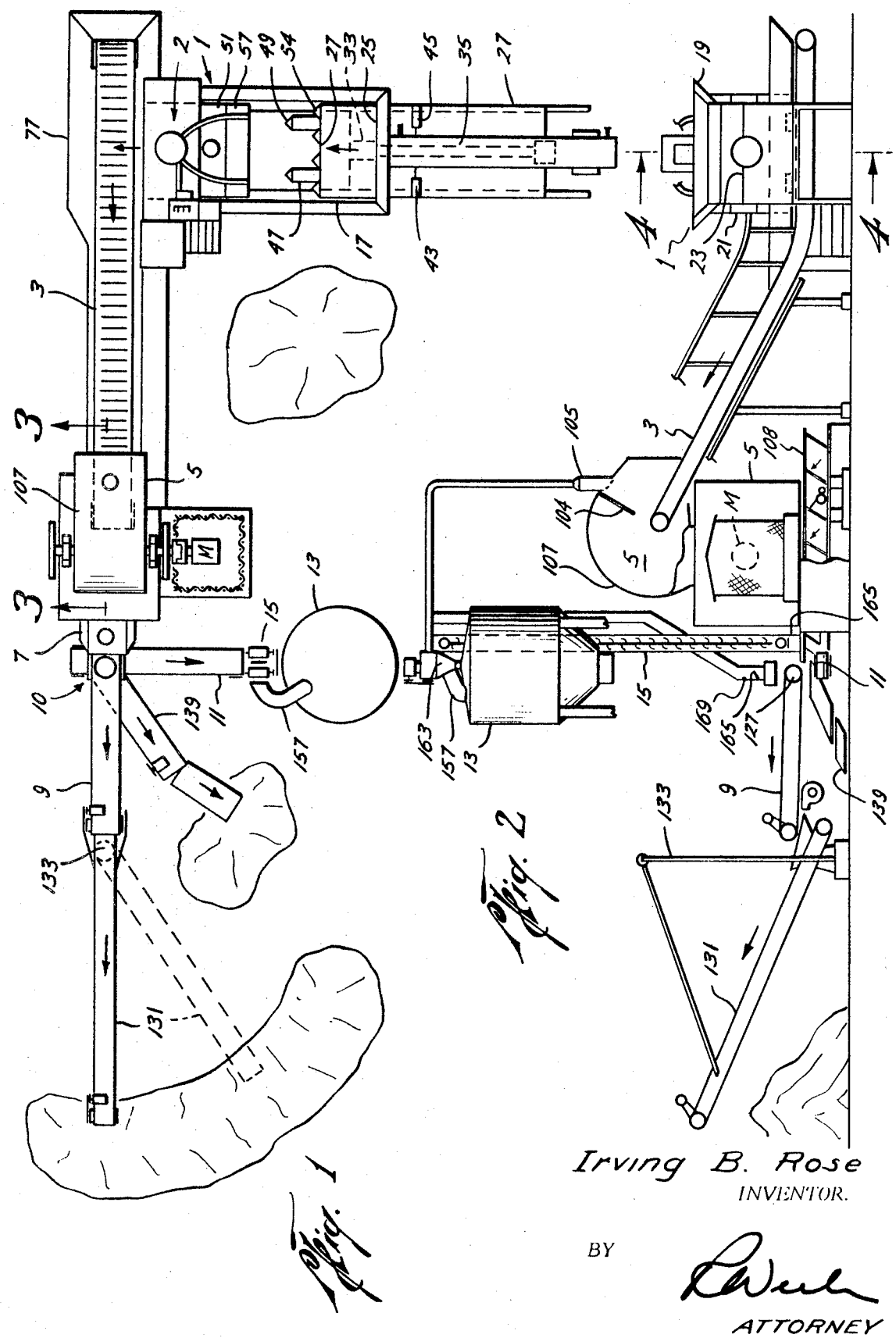

Irving B. Rose
INVENTOR.

BY

ATTORNEY

Irving B. Rose
INVENTOR.

BY

ATTORNEY

SYSTEM AND METHOD FOR REFINING FERROUS-BEARING SCRAP MATERIAL

BACKGROUND OF THE INVENTION

This invention pertains to a mechanized system for the preparation of secondary scrap for use by the iron and steel industry. More specifically it pertains to a method for processing scrap by compressing and shredding it into small pieces and for subsequently separating the ferrous from the nonferrous metal portions, and from nonmetallic waste.

In the past, a number of automated scrap-processing systems and related mechanisms have been known or utilized in the scrap recovery industry. Most of these systems, such as those illustrated in U.S. Pats. Nos. 25,034 and 2,150,984 are adapted for use only with extremely large quantities of scrap iron and steel. As a result, utilization of them is uneconomical unless very substantial quantities of scrap steel and iron can be fed into the system. A primary advantage of the present invention is its ability to be used in relatively small scrap-processing yards, such as where 50 to 150 tons of scrap or less are processed daily. Another feature of the invention is its ability to produce a particularly small and finely graded final product which can be readily handled and easily loaded for shipment to basic steel furnaces. Still another feature of the invention is the facility with which particularly bulky type of scrap material such as sheet metal parts of automobiles, refrigerators, ovens, and automobile bodies and frames themselves are handled during the processing operation. Such items are easily shredded and hammered into small pieces, after which the ferrous and nonferrous portions thereof may be separated and the dirt and refuse discarded.

Moreover, in the case of the process disclosed in Ser. No. 25,034, one of the more successful commercial operations presently in use, a burning step is required in order to remove nonmetallic refuse from the metal pieces. Such a step necessarily involves additional apparatus, fuel and maintenance costs, as well as additional personnel, as compared with the system and method of the present invention, which eliminates such a burning step and necessary apparatus altogether while still producing a high quality ferrous product.

The system in accordance with this invention comprises, a primary charging hopper into which automobile bodies, frames, or other bulky scrap material may be placed and initially subjected to a crushing operation to compress the bulky material into a relatively dense mass of greatly reduced dimensions. The densified mass is fed from the crusher to a ripper device operable to tear the mass into smaller pieces. The latter are then fed into a conveyor for carrying them to a shredding mill of the rotating hammer type, where the pieces from the ripper are further torn and broken into quite small shreds and particles adapted to form a fluent mass which is ejected from the shredder onto a shaker screen table. Then most of the nonmetallic refuse is separated by screening from the remaining metallic material which is then fed to a magnetic conveyor-classifier unit in which the metallic particles are separated into ferrous and nonferrous portions which are separately discharged to storage for further handling.

These and numerous other advantages and features of the invention will become apparent from the following detailed description when read in conjunction with the accompanying drawings which illustrate a useful embodiment in accordance with this invention.

In the drawing:

FIG. 1 is a top plan view of the system of the invention;

FIG. 2 is a side elevational view of the system of FIG. 1;

Figure 3:
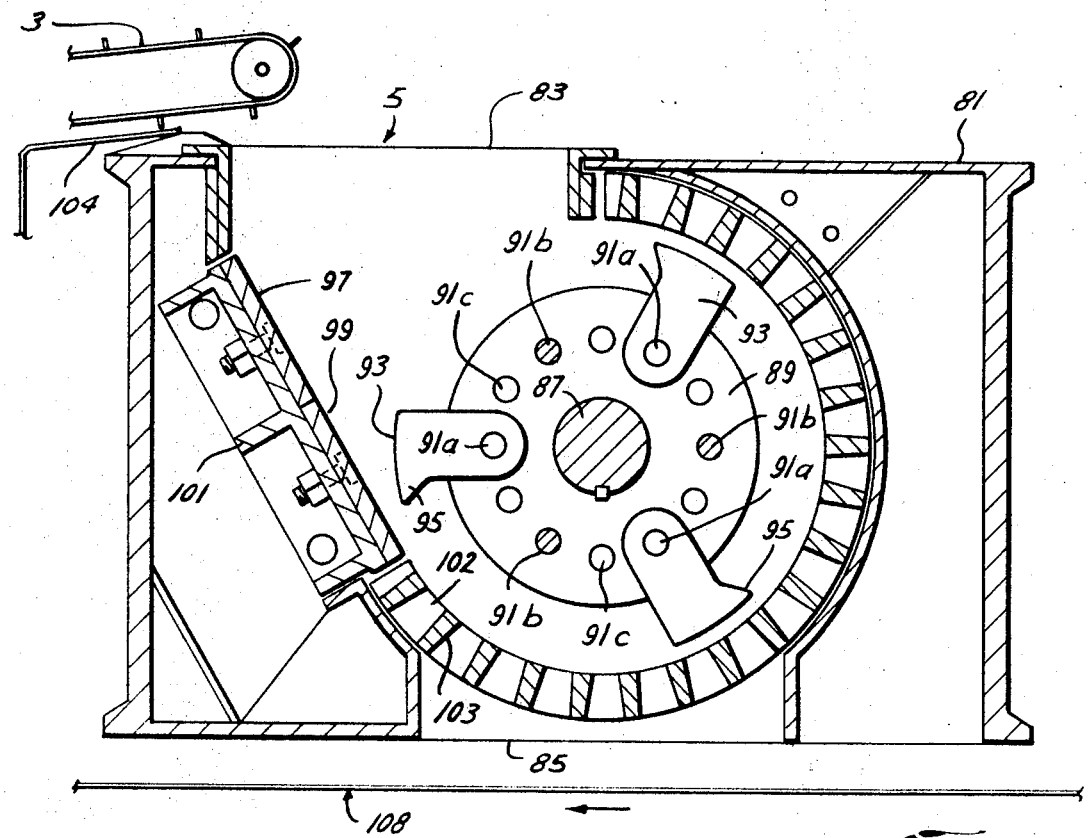
FIG. 3 is a sectional view of the hammer mill in FIG. 1 along the plane 3–3 thereof.

With reference to FIG. 1 there is shown the principal mechanical components of the metal-refining system of the invention. These include a crusher unit 1 into which large bulky metal pieces such as automobile bodies are placed and systematically compressed into a densified mass which is fed to a ripper unit 2 where the mass is torn into smaller pieces, a conveyor 3 operatively disposed adjacent the discharge of the ripper unit to carry the ripped scrap pieces from ripper unit 2 to a hammer-type mill 5. Crusher unit 1, ripper unit 2 and shredding mill 5 constitute the primary components of the system in that all of the actual cutting or shredding of the scrap is completed. The scrap material treated may be flat or shaped sheet metal, automobile frames, iceboxes, stoves, washing machines, water heaters, wire, rods, shafts, bars, plates, cast iron, tin plate or other ferrous or nonferrous scrap. The processing of large scrap pieces such as automobile bodies is generally initiated in the crusher unit 1 while smaller pieces may be loaded directly to conveyor 3. The other components of the system provide for and enhance the subsequent separation of ferrous from nonferrous pieces and the removal of refuse such as dirt, glass, and plastic from the final product. These other components, to be described and explained hereafter, include the shaker screen table 108, a magnetic conveyor-classifier section 10 including a stacking conveyor 9 for carrying processed ferrous pieces, a refuse conveyor 11 for carrying to a storage bin 13 the refuse and dirt separated from metallic material by the shaker table, and conveyor 139 for removing to a storage area the nonferrous metallic material.

Figure 4:
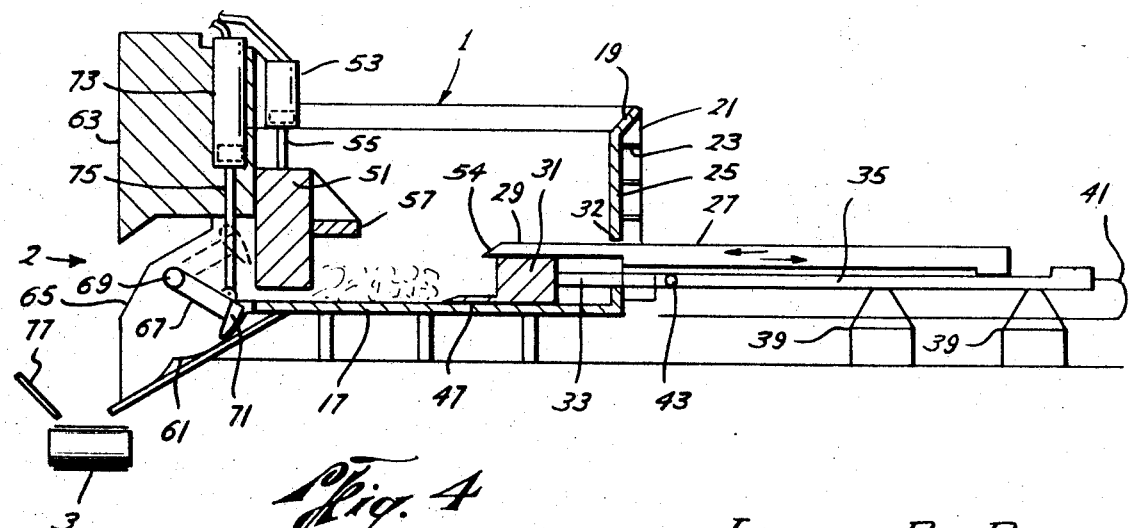
FIG. 4 is a sectional view of the ripper taken along line 4–4 of FIG. 2.

As best shown in FIGS. 1, 3 and 4, the crusher 1 includes a rectangular hopper 17 for receiving relatively large and bulky pieces of scrap such as an automobile body. The hopper is characterized by an outwardly directed upper skirt 19 which reduces spillover and facilitates charging of the hopper by crane, shovel or other mechanical means. The hopper itself is of heavy duty construction and may be made of steel plate on three sides which is reinforced exteriorly by both vertical and horizontal beam means 21 and 23, respectively. The hopper sides include the backwall 25 and longitudinal side walls perpendicularly disposed with respect thereto. The fourth side of the hopper is open, except for press 51, and communicates with ramp 61 described hereafter. Extending through an opening 32 in backwall 25 of the hopper is an elongate rectangular charging plate 27 having a width slightly less than that of the interior of the hopper. The length of the charging plate is greater than that of the hopper and it is adapted to reciprocally move in the hopper along the longitudinal axis thereof, as indicated by the arrows in FIG. 4. Carried on the forward end 29 of the charging plate 27 is a compression head or ram 31. The latter is fixedly connected such as by welding to the under surface of the charging plate and is similarly constructed of heavy gauge plate steel. The ram has a width slightly less than that of the hopper 17 and is coterminus with the forward end of the charging plate 27. The latter and ram 31 are reciprocally driven through the opening 32 in the backwall 25 of the hopper by means of a hydraulic piston 33 and cylinder 35 arrangement. The hydraulic cylinder is located along the longitudinal axis of the charging plate and is supported therebeneath by a plurality of support towers 39. Hydraulic fluid may be conducted to the cylinder by appropriate means such as conduit 41. Fixedly connected to or supported adjacent the exterior of backwall 25 is a pair of roller means 43, 45. Each of the roller means 43, 45 is disposed adjacent the longitudinal edge of the charging plate and in supporting relationship thereto so as to facilitate movement of the plate along the longitudinal axis of the hopper and to prevent any binding contact between the plate and hopper structure. Fixedly connected to the lower section of the compression ram 31 face is a pair of dogs 47, 49 whose function it is to push shredded scrap forwardly as described hereinafter. Also connected to the face of the compression ram 27 but on the upper portion are a plurality of smaller dogs 54, the function of which is to enhance compaction of the scrap at the end of the forward stroke of the ram. At the forward end of hopper 17 is a hydraulically operated press 51 adapted to be reciprocated in the vertical plane by means of hydraulic cylinder and piston structure 53 connected through a piston arm 55 to the press. Fixedly disposed on the rear face of press 51 is a restraining plate 57 the function of which is to partially compress the scrap that is immediately adjacent press 51 when the press is in its extended or down position, see FIG. 4. In this manner when the press is retracted to its raised position, forward movement of the compression ram drives the scrap preliminarily compacted by the plate 57 underneath the press 51 so that the scrap may be further compacted upon the downward movement of the press. As noted above, when the press is in its raised position there exists a free passageway between the interior of hopper 17 and the ripper ramp 61 on the opposite side of the press 51.

Figure 6:
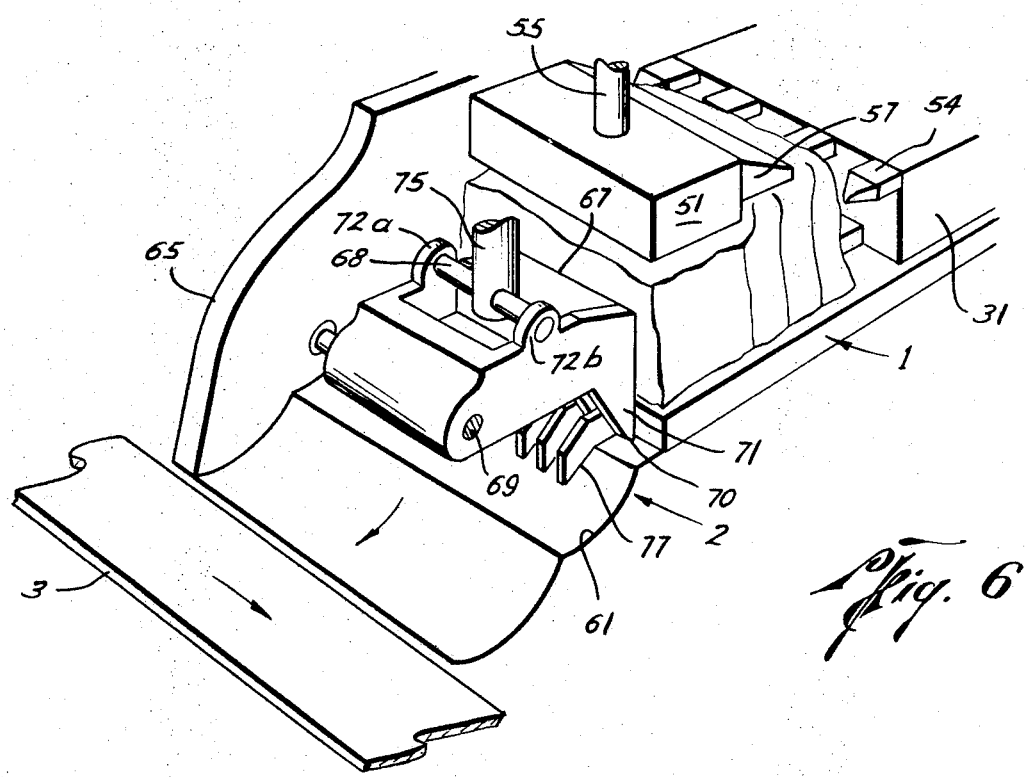
FIG. 6 is a perspective view of the forward portion of the ripper device, showing particularly the ripper blade and teeth.

As shown in FIGS. 4 and 6 the ripper further includes a housing 61 having sidewalls 65 (only one being shown) between which a ripper arm 67 is rockably mounted on an axle 69 to oscillate in approximately an 80° arc about its outer end. The inner end of arm 67 carries a plurality of downwardly directed ripper teeth 71 disposed in laterally spaced relationship to each other across the width of the arm, the width being substantially the same as the width of the hopper interior. The length of arm 67 is such that teeth 71 swing closely adjacent the forward end face of press 51 as ripper arm 67 is oscillated about axle 69 by means of a hydraulic piston and cylinder 73 through pivotally mounted stroke arm 75. The stroke arm is pivotally mounted to ripper arm 67 by means of an axle 68 extending through the arm and journaled in support bearings 72(a), 72(b) mounted on arm 67. As shown in FIG. 6 ripper arm 67 is adapted to oscillate about the axle 69 so as to rip or tear pieces of scrap from the face of the compacted mass being pushed out from beneath press 51. Teeth 71 are so-spaced across the free end of arm 67 as to pass through the spaces between a plurality of breaker teeth 77 fixedly disposed along the bottom surface of the inner ramp area 61 of housing 65. Although not shown in detail it will be recognized that the teeth 71 and 77 may be replaceably affixed each to the ramp and to arm 67 since they are subject to extreme, frictional, tensile and compression forces and may, therefore, wear rather rapidly.

In operation of the crusher and ripper units, hopper 17 is first charged with the large bulky type scrap which it is adapted to handle. This is normally done with the ram 31 in retracted position and with the press 51 also in a retracted position. When the appropriate amount of scrap has been placed in the hopper, the ram is actuated so as to drive the scrap towards the front of the hopper against and beneath the hydraulically actuated press 51 and plate 57. When the scrap is piled against and beneath the press, the press is brought down upon the scrap. During this time the hopper can continuously receive additional charges of scrap directly onto the top of charging plate 27. After the press 51 is in the extended position (i.e., scrap-compressing state) the ram is retracted. As it is retracted any scrap remaining on the top of charging plate 27 is scraped off the plate and falls to the floor of the hopper by the scraping action of backwall 25 as charging plate 27 and ram 31 move through opening 32. When the ram is fully retracted it is again moved forwardly to compress additional scrap against the existing mass. Press 51 is raised to permit slight forward movement of the mass, and then lowered to compress the scrap. It will be recognized that prior to each sequential movement of press 51, the plate 57 has partially compacted the scrap.

While press 51 is down, compressing and holding the densified mass, the teeth-carrying ripper arm 67 is operated to tear away the forward end of the scrap mass thereby tearing away substantial portions of sheet and other type scrap. As may be visualized in FIG. 6 the scrap is first wedged about teeth 71 but as the arm continues in its clockwise downward movement breaking teeth 77 coact with teeth 71 to assure ripping and tearing of the scrap mass into relatively small pieces. After arm 67 has been rotated back to its upward position (see dotted lines FIG. 4) the compacting sequence is repeated.

It will be understood that the movements of ram 31, press 51 and ripper arm 67 are timed by generally conventional control means (not shown) in such manner that the press will be in its raised position as the ram pushes a mass of scrap beneath the press, followed by a downward crushing movement of the press which greatly compresses the mass of scrap and holds it while teeth 71 are swung into tearing engagement with the forward end of the densified mass protruding from beneath press 51.

As the scrap and sheet is torn from the compacted mass the pieces are fed, either by gravity or manually, from ramp 61 onto conveyor belt 3 (FIGS. 1 and 2 and 6). The conveyor belt is characterized by a perimetal apron 77 which extends along its outer edge opposite the ripper discharge and serves to prevent scrap pieces from falling off the belt. The apron may extend throughout the length of the conveyor belt but would normally be of greatest width opposite the ripper discharge since it is here that scrap pieces are most likely to fall off the conveyor. The conveyor which is of the continuous or endless belt variety extends in a gradually upwardly sloping manner to the mouth of the shredding mill 5 where, as shown in FIG. 2, the scrap pieces are dropped off the end of the conveyor into the rotating hammers, see FIG. 3.

Shredding mill 5, as best seen in FIG. 3, comprises a frame or housing 81 having an inlet opening 83 in its upper wall in communication with the discharge end of conveyor belt 3, and an outlet opening 85 in its bottom wall in communication with the shaker table described hereinafter. A heavy duty rotor shaft 87 extends transversely of housing 81 and is journaled for rotation therein and supports a plurality of parallel rotor plates 89 each of which contains a series of angularly spaced mounting apertures 91(a) located at varying radial distances from the axis of the rotor shaft 87. Swingably mounted in the apertures of each rotor plate are a plurality of heavy duty hammers or milling shoes 93 having forwardly extending relatively sharp toe sections 95 on their leading edges for enhancing the milling action of the shoes against upper and lower breaker plates 97, 99, respectively. The toe sections 95 tend to grab the scrap pieces as they are fed through inlet 83 and pull them into the milling areas adjacent the breaker plates. Since the hammers are pivotally mounted they can absorb excessive crushing loads on the breaker plates without transmitting such loads directly radially to the rotor shaft 87. The breaker plates 97, 99 being subject to severe wear, are replaceably mounted upon the breaker plate bed 101 which is in turn supported upon and affixed to the framework of the housing 81 itself. Concentrically disposed within the housing 81 about the rotor and extending from the lower end of breaker plate 99 to one side of opening 83, an arcuate distance of about 250°, is a grate section 103 through which the scrap pieces shredded by the hammers fall and are discharged through outlet 85. Spacer bars 102 are disposed circumferentially about the rotor plates in perpendicular fashion to the grate section 103 so as to form a waffle-pattern. The relative size of the openings in the waffle pattern can be varied to influence the size of the milled scrap pieces. Although only three hammers 93 are shown in the illustration, it will be recognized that they may be disposed on a plurality of rotors 89 mounted in parallel manner on the rotor shaft 87. There may, for example, be five rotor plates with three or more hammers mounted on each plate.

Shaft 87 is driven by a suitable power source M, FIGS. 1 and 2, which may be an electric motor, diesel engine or any other well known power unit which may be equipped with conventional safety devices to prevent overloading, such as overload clutches, and the like.

In operation, the still relatively large size scrap pieces leaving the ripper, or supplied directly from other sources to conveyor 3, is fed into inlet opening 83 of housing 81 by the conveyor. The material is immediately compressed, wedged, extruded and torn by the high speed (2,100 blows or more/minute) rotating hammers 93 which vigorously slam the material up against the breaker plates causing it to be literally exploded or torn apart by coaction between the hammers and the breaker plates. It will be recognized that under such conditions the hammers will be subject to severe wear and in order to maintain their effectiveness they may periodically be moved outwardly from the rotor shaft simply be changing their radial position with respect to axle 87. Thus apertures 91b and 91a are arranged at different radial distances from the axle. Repetitive turning of the shoes causes continuous bending and breaking of the steel and metal until it is of sufficient size to fall onto the grate or through it onto shaker table 108. Frequently, pieces of scrap material will be recycled within the mill and reworked before it is shredded sufficiently. Occasionally, for example, an uncrushable piece may be ejected out of the mill through inlet 83. To protect personnel various baffle means such as at 104 (FIG. 2) may be utilized. Similarly the conveyor 3 may be reversible in order to prevent damage or injury when an uncrushable piece is encountered. Further due to the rotating action and high dynamic forces within mill 5, substantial amounts of dust and flying particles are created therewithin. In order to reduce the amount of dust going out of the mouth of the mill a dirt and dust suction-type pickup 105 is provided on the hood 107 enclosing the shredding mill. Nevertheless, large amounts of dirt, glass particles, and heavy nonmetallic refuse fall through grate section 103 along with the processed scrap pieces. This material and scrap fall as best shown in FIG. 2, to the shaker screen or table 108 which is positioned immediately beneath the exit 85 of the shredder.

As a result of the preceding processing steps including the severe shredding action occurring in mill 5, the scrap material will be reduced to a readily fluent mass of quite small particles, in which the metallic particles, both ferrous and nonferrous, will be largely freed from nonmetallic materials, all of which will fall on shaker screen table 108. The mesh size of the screen will be selected such as to pass much of the nonmetallic material which will be largely pulverized to much smaller particle sizes than the metallic materials, and to retain and separate the metallic particles therefrom.

Figure 5:
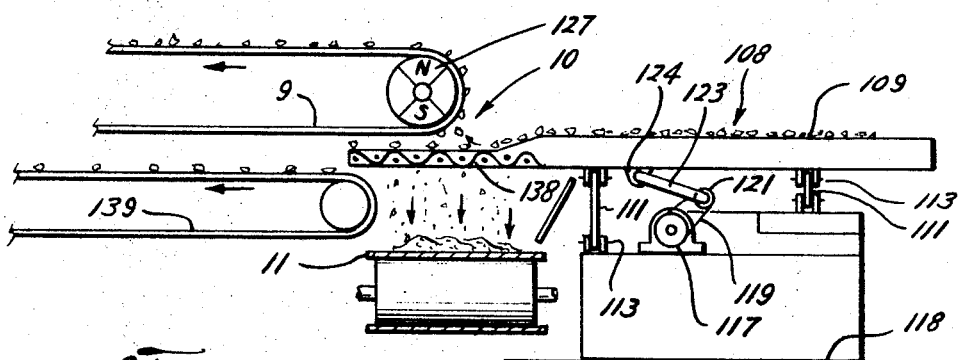
FIG. 5 is a side view of the shaker table-magnetic conveyor-classifier section.

With reference now to FIG. 5, there is shown a general illustration of the structure of the shaker screen table 108 which is adapted to move scrap in a predetermined direction by imparting repetitive bouncing movements thereto. The surface plate 109 of the table is of rigid construction such as plate steel and is mechanically mounted and motor driven in a manner providing for a reciprocating upward and lateral movement as indicated by the illustrating arrows. The table, which may be of any appropriate length, is supported for example by a plurality of spacer plates 111 made of flexible spring steel. The lower end of the spacer plates are fixedly connected by clamp and pin means 113 to the base 118 of the table while the upper end of the spacer plates are connected to the bottom surface of the shaker table by similar clamp and pin means. In this manner the surface plate is connected to and supported by the base in a manner so that upon the application of force to the plate 109 a vibratory motion is set up. Operatively supported upon the base beneath the plate 109 is an appropriate motor 117 which is operatively connected such as by belt means 119 to a rotating cam 121. The cam in turn has connected to a peripheral edge thereof in freely movable manner a drive arm 123 which is connected to axle means 124 on the underside of plate 109 so that upon actuation of the motor 117 the drive arm connection to cam 121 sets up a "throw" type motion to the plate 109 or table surface. In this manner, scrap metal pieces, refuse or any other material on the surface of the table are caused to be thrown or bounced forwardly off the end of the table onto a screen 138 through which most of the nonmetallic refuse will fall to refuse conveyor 11.

Conveyor 9, which comprises a flexible belt, is proximately disposed adjacent the end of screen 138 such that the pieces of metal are thrown against the belt which is supported on and rotated by the counterclockwise moving magnetic wheel 127. The ferrous pieces are attracted to the portion of the belt overlying wheel 127 by the magnetic force of the wheel and are thereby picked up and deposited on the surface of the belt as it passes over the wheel, thus carrying them towards the upwardly inclined stacking conveyor 131 (see FIGS. 1 and 2). The stacking conveyor thereafter carries the ferrous pieces to an appropriate storage area where they are piled. The stacking conveyor may, as shown in FIG. 2, be pivotably supported by boom means 133 at a point adjacent its intersection with the conveyor 9 so that the scrap may be piled in various storage areas by radial movement of conveyor 131.

As best shown in FIG. 5 the nonferrous metal and refuse such as glass and dirt continue through beneath the magnetic wheel 127 and onto the shaker screen 138. Nonferrous metal pieces are generally bounced across the screen and onto the nonferrous scrap metal conveyor belt 139 which is disposed at the distal end of shaker screen 138. In this manner dirt and other refuse are reasonably effectively sifted through the screen and onto the refuse conveyor 11, thus separating the same from the ferrous and nonferrous metals. Conveyor 11 in turn carries the refuse to the bucket elevator and refuse hopper described hereinafter. It is thus seen that after the material has been processed through the ripper and shredding mill, the shaker table in conjunction with the refuse screen and magnetic pickup wheel 127 effectively separates and distributes the ferrous from nonferrous metal and also from the refuse in the original scrap metal charge.

Although the shaker screen 138 will usually be effective to remove most of the nonmetallic dirt and refuse from the metallic particles, some larger pieces of nonmetallic material may accompany the metallic particles onto the nonferrous metal conveyor 139. Final cleaning of the metallic particles reaching conveyors 133 and 139 may be effected manually, when found necessary.

With reference now to FIG. 2, there is shown a dust and dirt withdrawal conduit 105 having one end communicating with the interior of hood 107 of the shredding mill 5 so as to reduce the amount of dust that would flow out of the mouth of the mill and thereby contaminate the working atmosphere. The other end communicates with a conventional cyclone separator 163, the function of which is to remove solid matter from the air and drop it into refuse silo 13. A bucket elevator 15 carries solid refuse discharged from conveyor 11 up from ground level and dumps it into refuse silo 13 via a chute 157. A second suction conduit 169 connects at one end to a suction hood 165 disposed immediately above magnetic wheel 127 and shaker table 108 in order to remove the excess dust and atmospheric contamination which normally occurs there. The other end of conduit 169 connects to conduit 105 and thence to cyclone separator 163.

While the illustrations and description herein constitute a preferred embodiment of the scrap-processing system of the invention, many modifications and variations thereof, both as to the machinery and process itself, can be made by one skilled in the art without departing from the spirit of the invention and the scope of the claims appended hereto.

That which is desired to be secured by United States Letters Patent is:

I claim:

1. A system for refining raw ferrous-bearing scrap material, comprising:
   a. crusher means for compacting raw scrap material into a densified mass;
   b. hopper means adjacent said crusher means for receiving said raw scrap material;
   c. ram means movably mounted in said hopper means for advancing said raw scrap material to and through said crusher means;
   d. ripper means disposed immediately adjacent the outlet of the crusher means operable to rip the forward face of the densified mass advancing from the crusher means while under compression in said crusher means into substantially smaller pieces;

e. a shredding mill disposed to receive said pieces from said ripper means and operable to shred and break said pieces into a fluent stream of comparatively small particles;

f. shaker screen means disposed to receive the particulate material discharging from said shredding mill and operable to separate metallic particles from largely nonmetallic refuse; and g. magnetic conveyor-classifier means disposed to receive said metallic particles from said shaker screen means and operable to separate the same into ferrous and nonferrous portions and to deliver the so-separated portions to separate storage areas.

2. A system according to claim 1 wherein said ripper means includes an arm member mounted for oscillatory movement across the face of said densified mass discharging from said crusher means and carrying a plurality of spaced ripper teeth disposed to tear through said mass.

3. A system according to claim 1 including conveyor means for transferring said smaller pieces from the discharge of the ripper means to the shredding mill.

4. A system according to claim 1 including vacuum dust-collector means having one collector conduit communicating with the interior of said shredding mill and a second collector conduit disposed in dust-collecting relation to said shaker screen means.

5. A system according to claim 1 wherein said shredding mill includes:
 a. a rotor;
 b. a plurality of hammers swingably mounted about the periphery of the rotor and having relatively sharp toe portions projecting from the leading edges thereof; and
 c. breaker plates disposed adjacent the path of movement of said hammers against which said pieces are broken and shredded by impacts of said hammers.

6. The method of refining raw ferrous-bearing scrap material, comprising:
 a. subjecting bulky raw scrap material to an initial crushing action to produce a densified mass therefrom;
 b. ripping the densified mass into smaller pieces while said mass is maintained under the crushing pressure;
 c. subjecting said smaller pieces to a shredding treatment operably to produce therefrom a fluent mass of relatively finely divided particulate material;
 d. separating nonmetallic refuse from metallic particles in the fluent mass; and
 e. separating said metallic particles into ferrous and nonferrous portions.

7. A process for the continuous production of presized high grade scrap metal from auto bodies and similar large bulky type material, including the steps of:
 a. subjecting the scrap charge to crushing pressure to compact the same into a densified mass of balelike configuration;
 b. systematically ripping the mass while subject to said crushing pressure into relatively large size pieces;
 c. dynamically disintegrating the relatively large size pieces to produce there from relatively small size scrap pieces which are of either predominantly ferrous or nonferrous metal composition; and
 d. separating the predominantly ferrous from nonferrous metal pieces; and conveying said pieces to separate storage areas.